United States Patent
Puschmann et al.

(10) Patent No.: US 7,207,524 B2
(45) Date of Patent: Apr. 24, 2007

(54) DEVICE FOR WARNING OF DIFFERENTIAL PRESSURE DURING THE OPENING OF A PRESSURIZED CLOSING DEVICE PERTAINING TO AN OPENING IN THE FUSELAGE OF AN AEROPLANE

(75) Inventors: Carsten Puschmann, Hamburg (DE); Wolfgang Lessat, Hamburg (DE); Jens Hasse, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 33 days.

(21) Appl. No.: 10/526,424

(22) PCT Filed: Sep. 1, 2003

(86) PCT No.: PCT/DE03/02906

§ 371 (c)(1),
(2), (4) Date: Mar. 1, 2005

(87) PCT Pub. No.: WO2004/022425

PCT Pub. Date: Mar. 18, 2004

(65) Prior Publication Data

US 2006/0006285 A1    Jan. 12, 2006

(30) Foreign Application Priority Data

Sep. 3, 2002 (DE) ................. 102 40 511
Jun. 25, 2003 (DE) ................. 103 28 431

(51) Int. Cl.
*B64C 1/14* (2006.01)
*G01L 19/12* (2006.01)

(52) U.S. Cl. ................ 244/129.5; 244/129.4; 244/1 R; 116/70

(58) Field of Classification Search ............ 244/188.5, 244/129.5, 129.4, 129.1, 1 R; 49/21, 460; 454/70–74; 73/40.5 A, 40.5 R; 116/70, 116/112
See application file for complete search history.

(56) References Cited

U.S. PATENT DOCUMENTS 2,596,116 A * 5/1952 Bamber ............... 200/61.58 R
2,638,579 A * 5/1953 Dyche, Jr. et al. ......... 340/966

(Continued)

FOREIGN PATENT DOCUMENTS

DE    2 113 406    9/1972

OTHER PUBLICATIONS

"Box". Academic Press Dictionary of Science and Technology (1992). Retrieved Jul. 19, 2006, from xreferplus. http://www.zreferplus.com/entry/3080250.*

*Primary Examiner*—Robert P. Swiatek
*Assistant Examiner*—Joseph W Sanderson
(74) *Attorney, Agent, or Firm*—W. F. Fasse; W. G. Fasse

(57) ABSTRACT

An apparatus warns of differential pressure during the opening of a pressure-loaded door that closes an opening in an aircraft fuselage. An air guide passage extends from the side with higher pressure to the side with lower pressure. The air guide passage is closeable by a valve that is controllable with a control lever operatively Connected to a door opening mechanism. When there is a differential pressure between the two sides, upon opening of the valve the apparatus produces an acoustic signal as a differential pressure indication that is independent of a supply system and serves as a warning signal for the operator of the aircraft door.

18 Claims, 8 Drawing Sheets

U.S. PATENT DOCUMENTS

| | | | |
|---|---|---|---|
| 2,748,855 A * | 6/1956 | Siems et al. | 49/168 |
| 2,960,923 A * | 11/1960 | Rominger et al. | 454/74 |
| 4,042,193 A * | 8/1977 | Cerne | 244/129.1 |
| 4,473,201 A * | 9/1984 | Barnes et al. | 244/129.5 |
| 4,552,326 A | 11/1985 | Bokalot | |
| 4,646,582 A * | 3/1987 | Kijima | 74/473.33 |
| 4,720,065 A * | 1/1988 | Hamatani | 244/129.5 |
| 5,069,401 A * | 12/1991 | Shepherd et al. | 244/118.5 |
| 5,118,053 A * | 6/1992 | Singh et al. | 244/118.5 |
| 5,156,359 A * | 10/1992 | Noble et al. | 244/129.4 |
| 5,337,977 A | 8/1994 | Fleming et al. | |
| 5,541,378 A * | 7/1996 | Niklaus | 200/400 |
| 5,577,781 A * | 11/1996 | Kallies et al. | 292/195 |
| 5,782,511 A * | 7/1998 | Schwarz | 292/219 |
| 5,931,415 A * | 8/1999 | Lingard et al. | 244/129.5 |
| 5,944,285 A * | 8/1999 | Royer et al. | 244/129.4 |
| 6,161,539 A * | 12/2000 | Winter | 128/205.24 |
| 6,685,139 B2 * | 2/2004 | Blum et al. | 244/129.5 |

* cited by examiner

DEVICE FOR WARNING OF DIFFERENTIAL PRESSURE DURING THE OPENING OF A PRESSURIZED CLOSING DEVICE PERTAINING TO AN OPENING IN THE FUSELAGE OF AN AEROPLANE

FIELD OF THE INVENTION

The invention relates to an apparatus for warning of differential pressure during the opening of a pressure-loaded closing device of an opening in the aircraft fuselage by means of an opening mechanism.

BACKGROUND INFORMATION

For aircraft doors as possible closing devices for openings in the aircraft fuselage, which are to be opened by a manual force after a landing even with a pressure difference between cabin (side of the higher pressure) and surrounding environment (side of the lower pressure), there exists the danger, that the operator of the door suffers harm due to the rapid opening movement of the door or also due to the arising airflow from the cabin to the outside. Accidents prove that such endangerments can arise. In order to prevent this, there exists, for example in passenger aircraft, an electrically driven optical warning mechanism consisting of a red lamp in the window area of the door, which begins to blink in connection with an existing differential pressure and a deactivated emergency slide trigger. Thereby, it is to be signaled to the operator, that an operation of the door is potentially dangerous and should not be carried out so long until the pressure equalization has taken place. This is unobjectionable for a normal deplaning of the aircraft. In the case of an emergency evacuation of the aircraft, in which all occupants must have exited from the aircraft within 90 seconds, untrained persons such as passengers would cease or abstain from the operation of the doors due to the blinking warning lamp. The consequence thereof would be a drastically delayed evacuation.

Furthermore, due to the necessary electrical energy supply, the warning function of the blinking lamp is limited to scenarios in which a current supply is available from the onboard power network or grid or an autonomous supply source.

SUMMARY OF THE INVENTION

Object of the present invention is thus to construct an electrically independent and reliable apparatus which indicates an existing differential pressure to trained persons in direct dependence on the operation of the door opening mechanism. Thereby, the possibility is to be provided, to initiate or carry out a relieving of the pressure.

Simultaneously, the apparatus may not impair the operation of the door opening mechanism in an emergency situation, in order to enable a rapid evacuation of all occupants in the emergency case.

This object is achieved according to the invention by the measures set forth herein.

With the inventive warning apparatus, an acoustic warning signal is produced, which is triggered through the pressure compensation or equalization between cabin and surrounding environment. The acoustic signal is produced by a valve, of which the opening and closing is controlled by the operation of the door opening mechanism. In that regard, according to the invention, it is especially advantageous that the system manages to operate without electrical current supply and completely autonomously. The perception of the signal is not direction dependent, that is to say, that a particular orientation of the body is not necessary in order to perceive the warning. The warning is similarly not impaired by light conditions at different times of day or poor lighting conditions. It is a considerable advantage that the warning is directly coupled to an operating manipulation on the door that is to be opened.

Moreover, false alarms or signals are excluded and the warning apparatus achieves a very high reliability.

The coupling of the valve opening to the operation of the door opening mechanism independently of the position or setting of the emergency slide trigger of the aircraft door enables the operator (flight attendant) to recognize the operative connection or context and to cause the opening of the outlet valves of the aircraft. Hereby, the safety for the cabin personnel is increased considerably.

Simultaneously, the evacuation capability of the aircraft is not limited, because an opening of the door is possible even with an activated emergency slide.

A further advantage of this solution is the possibility, especially for aircraft already in service, to retrofit or after-equip the inventive warning apparatus on the aircraft doors in addition to or alternatively to already existing warning mechanisms.

Further developments and advantageous embodiments of the invention are set forth in the dependent claims. Further individual details and advantages arise from the following description of example embodiments of the invention.

Possibilities for an acoustic warning of an operator of an aircraft door are recited in dependent claims.

Further inventive features enable a timely interruption of the opening process of the aircraft door, if a differential pressure arises and the warning apparatus functions in direct connection with the opening mechanism. Through the provision of a two-stage execution of the opening process, whereby the coupling of the valve opening is connected with the first stage, for example through operating or removing a flap, it is ensured that an undesired opening with an existing pressure difference is prevented.

Other dependent claims represent alternative arrangement possibilities of the warning apparatus in the door area of an aircraft fuselage.

Another advantageous further development according to one embodiment of the invention enables a warning function not only in an acoustic manner, but also through the feeling of a targeted oriented air stream.

In a further dependent claim, embodiments of an air guide passage in the aircraft door area, are set forth.

A hole in the outer covering skin of the door can be avoided with the connection of the warning apparatus to the outside hand lever box according to further detailed example embodiments according to the invention.

Moreover, the arrangement of the control lever in operative connection with the valve according to further example embodiments is of great importance. Through the type and the arrangement of the utilized seal rubber and the further valve components, it is achieved that the valve is surely closed and an existing differential pressure continuously loads the seal rubber and thus surely closes the outflow opening in the valve, as well as the opening of the valve being connected with an acoustic signal, if a differential pressure exists. Also advantageous is the arising noise level in connection with the generation of the hissing/rushing noise behind the door interior paneling, because thereby an opening for further conveying the noise can be omitted. Thus, the noise insulation of the door is not impaired.

Through the suggested arrangement according to further claims, it is ensured that the locking process of the door is not impaired by the warning apparatus, but rather additionally supports or assists it in addition to the already existing elements, and also that adequate reaction time for a user still remains available during the opening process.

BRIEF DESCRIPTION OF THE DRAWINGS

Example embodiments of the invention are illustrated in the drawing, and will be described in further detail below in connection with the FIGS. 1 to 7. In the figures, the same components are provided with the same reference characters.

It is shown by.

DETAILED DESCRIPTION OF EXAMPLE EMBODIMENTS OF THE INVENTION

Figure 1:
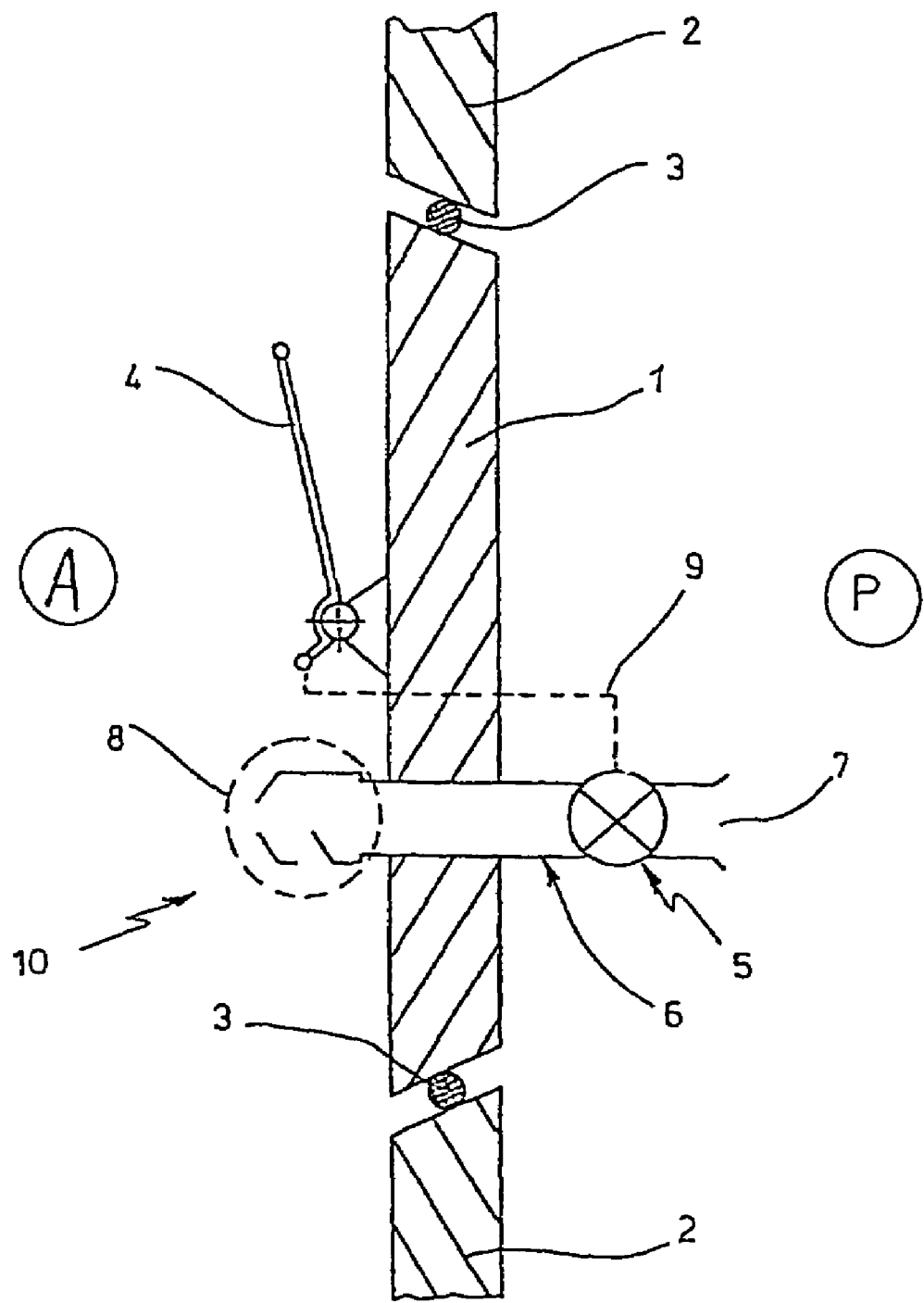
FIG. 1 the schematic view of an inventive apparatus for warning in a first embodiment.

In FIG. 1, there is schematically shown an inventive apparatus for the warning 10 in a first embodiment carried out as an acoustic remaining pressure warning system with an operating level on the outer side of an aircraft. In the illustrated first example embodiment, the warning system 10 is integrated in a door 1, which especially offers the advantage that no additional installations are necessary outside of the door in a frame structure. Instead of a door 1, other openings, such as, for example, windows or flaps, are also conceivable, which comprise closing mechanisms and on which a pressure difference can arise. The door 1, a door frame 2, and a seal 3 form the barrier between the low pressure (outside environment A) and the higher pressure (passenger cabin P). For example, aircraft doors are embodied or constructed in such a manner. A necessarily provided door suspension and a similarly necessarily provided door locking mechanism are not illustrated in this embodiment. Also after the landing of the aircraft, a pressure difference can still arise between the passenger cabin and the environment. The illustrated door 1 has an opening direction toward the lower pressure (outside environment A), which makes a warning system 10 necessary for the protection of the operator. The warning system 10 can be arranged not only on the side with the lower pressure A, but rather as needed also on both sides or on the side impinged on by the higher pressure (P). The inventive remaining pressure warning system 10 consists of an air inlet 7, a valve 5, an air guide passage 6 in the embodiment of a connection pipe, and a whistle 8. The valve 5 is connected via a mechanical connection 9 with a door operating lever 4. In the illustration as shown, the door operating lever 4 is mounted on the side of the lower pressure (A), but, just as well, embodiments are also possible, which provide the door operating lever 4 on the side of the higher pressure (P). Furthermore, embodiments are conceivable, which comprise respectively one operating lever 4 on both sides of the door 1. The energy that is necessary for producing the warning is acquired from the pressure difference between P and A. This principle includes the advantage that the apparatus for warning is deactivated when no differential pressure arises. It is further of advantage that the system 10 manages to operate without an energy source and works completely autonomously.

An arrangement of the apparatus 10 also next to the door 1, that is to say possibly in the door frame 2 or in (not illustrated) wall elements in the door area are similarly conceivable as embodiments.

The manner of operation of the warning system 10 is described in the following:

The valve 5 is closed with a closed and locked door 1. If a person opens the door 1 by means of the door operating lever 4, the valve 5 is opened via the mechanical connection 9 before the opening process. The mechanical connection 9 can be embodied as a Bowden cable link or a tension cable arrangement, as a lever/rod mechanism or as a transmission (e.g. toothed gear wheel) mechanism or typically known actuator arrangements can find application. The door operating lever 4 as well as the mechanical connection 9 are adjusted so that the valve 5 is opened before the door 1 is unlocked or unlatched and possibly could open by itself due to the differential pressure P-A. If no differential pressure between P and A is present, then also no warning will take place, and the operator can proceed with the opening process. If, however, a differential pressure P-A is present, this will give rise to an airflow through the air inlet 7, the now open valve 5, the connection pipe 6, and the whistle 8. The airflow through the whistle 8 produces a loud noise as a warning. With such an acoustic signal, the operator is warned against an unlocking and opening of the door 1. In combination with the acoustic signal, or correspondingly as an individual sole means, through a clever or skillful arrangement of the connection pipe 6, the airflow can be directed through the door operating lever 4 or in a direction of the operating lever 4 onto the hand of the operator, if the operation is carried out on the side of the lower pressure (outside environment A). Instead of the connection pipe 6, any other air guide channels are also conceivable. Every door operator will instinctively connect or associate the feeling of the airflow and/or the occurrence of a loud and surprising noise with the just-started action or operation, and immediately interrupt this action or operation. Through the direct connection or association between his action and the arising warning signal, the causal connection or association is understandable for an operator of the door. In a simple manner, a warning signal can be effectively produced, which indicates the danger of an undesired sudden impact-like opening of the door and therewith an endangerment of the operator.

Figure 1A:
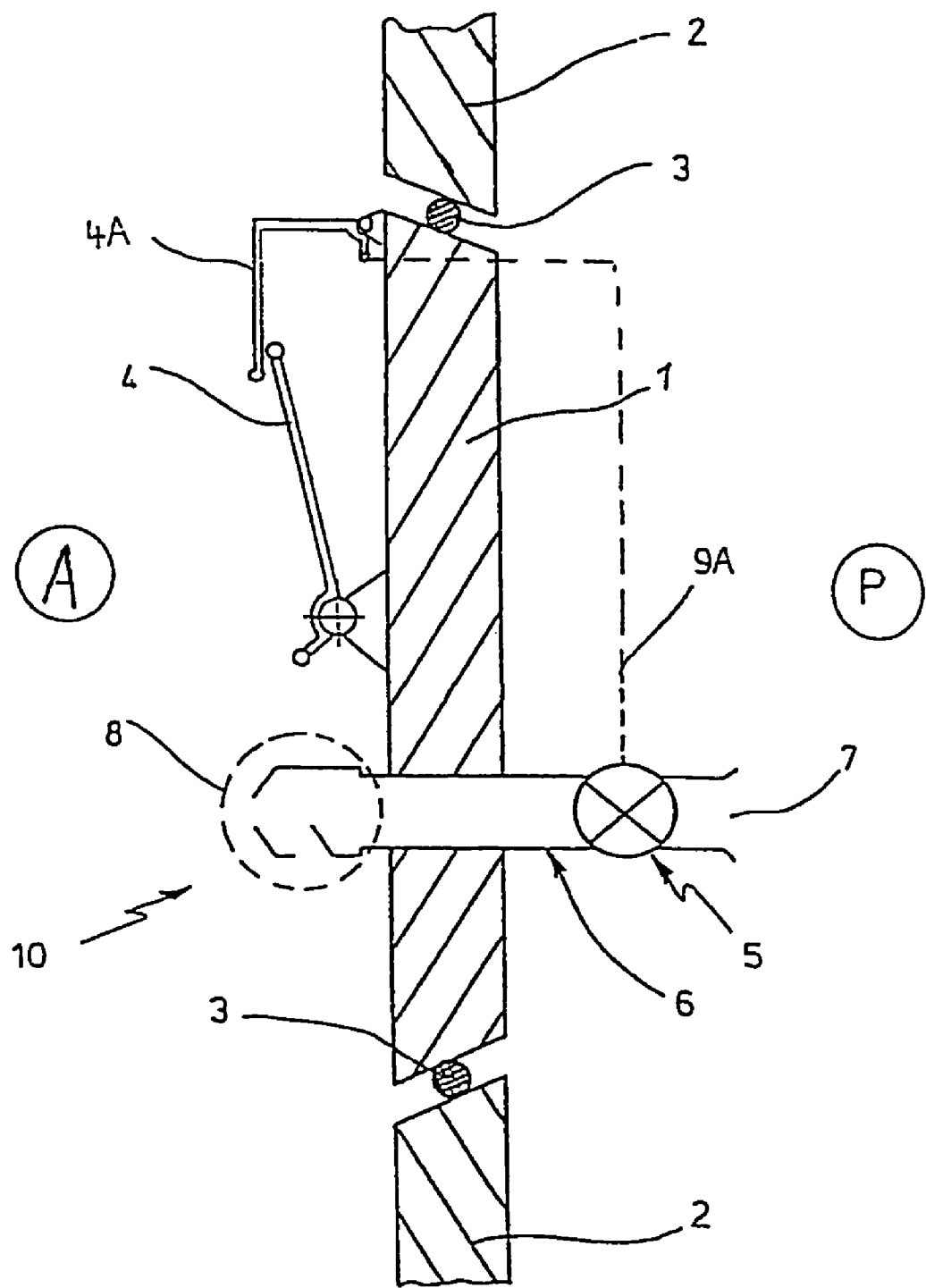
FIG. 1A a development of the first embodiment of the warning apparatus according to FIG. 1.

It is provided, to embody the door opening mechanism in such a manner so that after activation of the warning system 10, sufficient reaction time still remains in order to interrupt the door opening process before the door opens itself or can be opened. For this purpose, a two-stage operating mechanism is provided in a variation of the first embodiment illustrated in FIG. 1A. A flap 4A, which releases or opens the access to the opening lever 4, is to be opened first. The mechanical connection 9A for the activation of the warning system 10 is connected with this flap 4A, that is to say, before the door opening lever 4 is operated, the warning system 10 can give off a signal for the warning. In a further embodiment of the invention, a two-stage opening can progress in such a manner that an opening of the lever is carried out up to a first position, here a corresponding signal can be reacted to, and then, possibly after overcoming a blockage or detent, the opening of the door is carried out. In a further embodiment, the inventive apparatus 10 can also be provided as a supplement to existing pressure difference warning systems.

Figure 2:
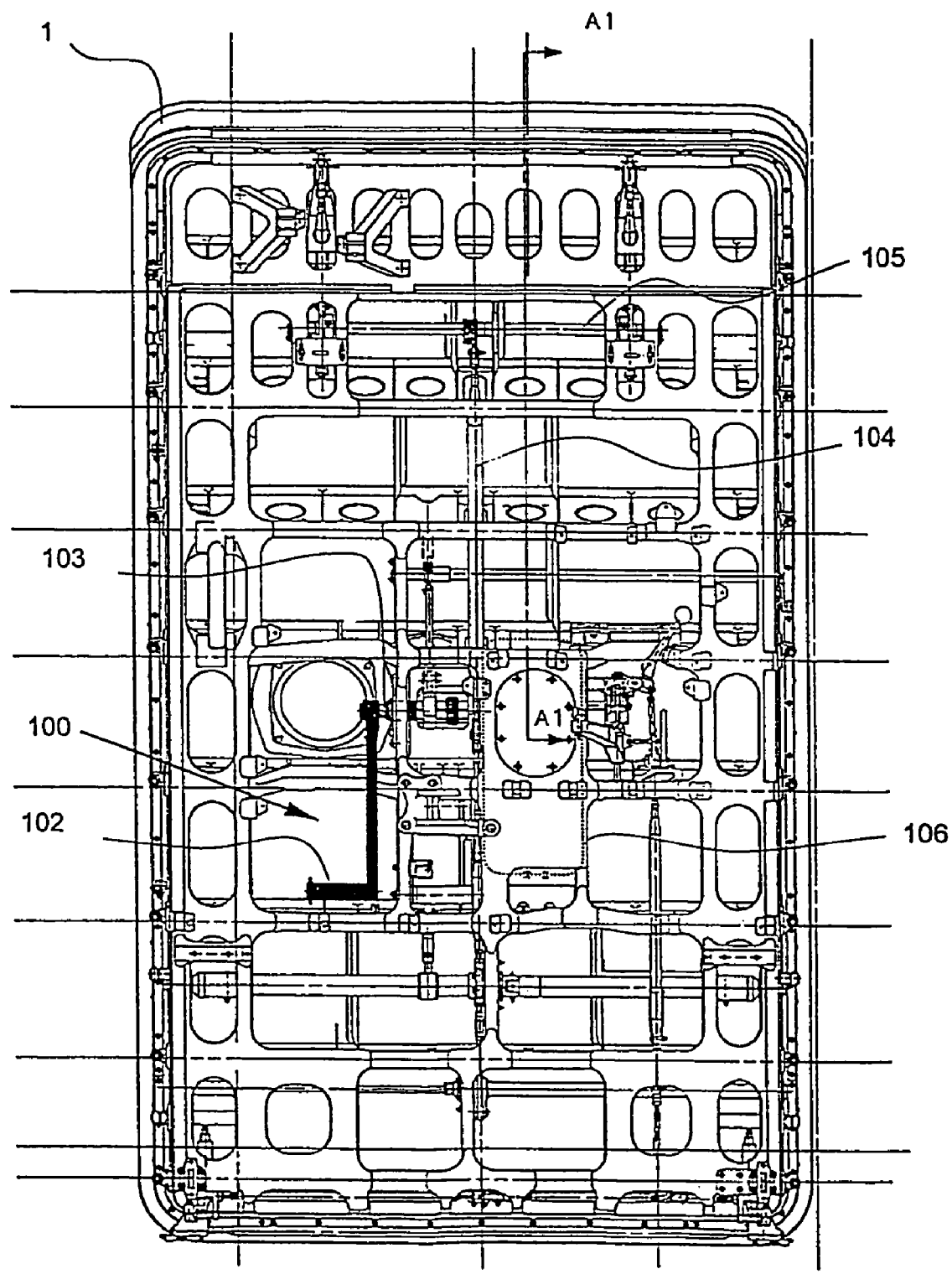
FIG. 2 the inside view of a passenger door with an existing door opening mechanism, whereby the section A1—A1 refers to a possible installation location for the apparatus for warning in a second embodiment as a pneumatic remaining pressure indicator.

In the FIG. 2 et. seq., a second embodiment of the apparatus for warning is illustrated in a constructive reduction to practice of the inventive idea. FIG. 2 shows the basic structural construction of an aircraft door 1 as well as a door opening mechanism 100 for the opening and closing of the aircraft door 1. According to the invention, a pneumatic remaining pressure indicator 200 is provided on the door opening mechanism 100 as a second embodiment of the warning apparatus (shown in FIG. 3), which signals a possible pressure difference between the aircraft cabin of an aircraft and the environment, if an opening of the aircraft door is to take place after the landing. The utility or applicability of the inventive mechanism for warning of a differential pressure is, however, not limited to doors, but rather is possible also for gates, windows and flaps.

For the door opening of the aircraft door 1 from the inside, it is necessary to pull the inner hand lever 102 upwardly, in order to set the hand lever shaft 103 in rotation (counter-clockwise). This drives a connecting rod 104, which in turn sets the locking shaft 105 in rotation (clockwise). Thereby, the rotation of the hand lever shaft 103 and of the locking shaft 105 is the same except for the rotation direction. The section A1—A1 in FIG. 1 (also see FIG. 3) references a possible position for the inventive apparatus 200 for warning of differential pressure. The area of the outside hand lever box 106 as possible position of a through-flow opening 206 of the outside environment A and the passenger cabin P within an aircraft fuselage is located at the lower end of this section path.

Figure 3:
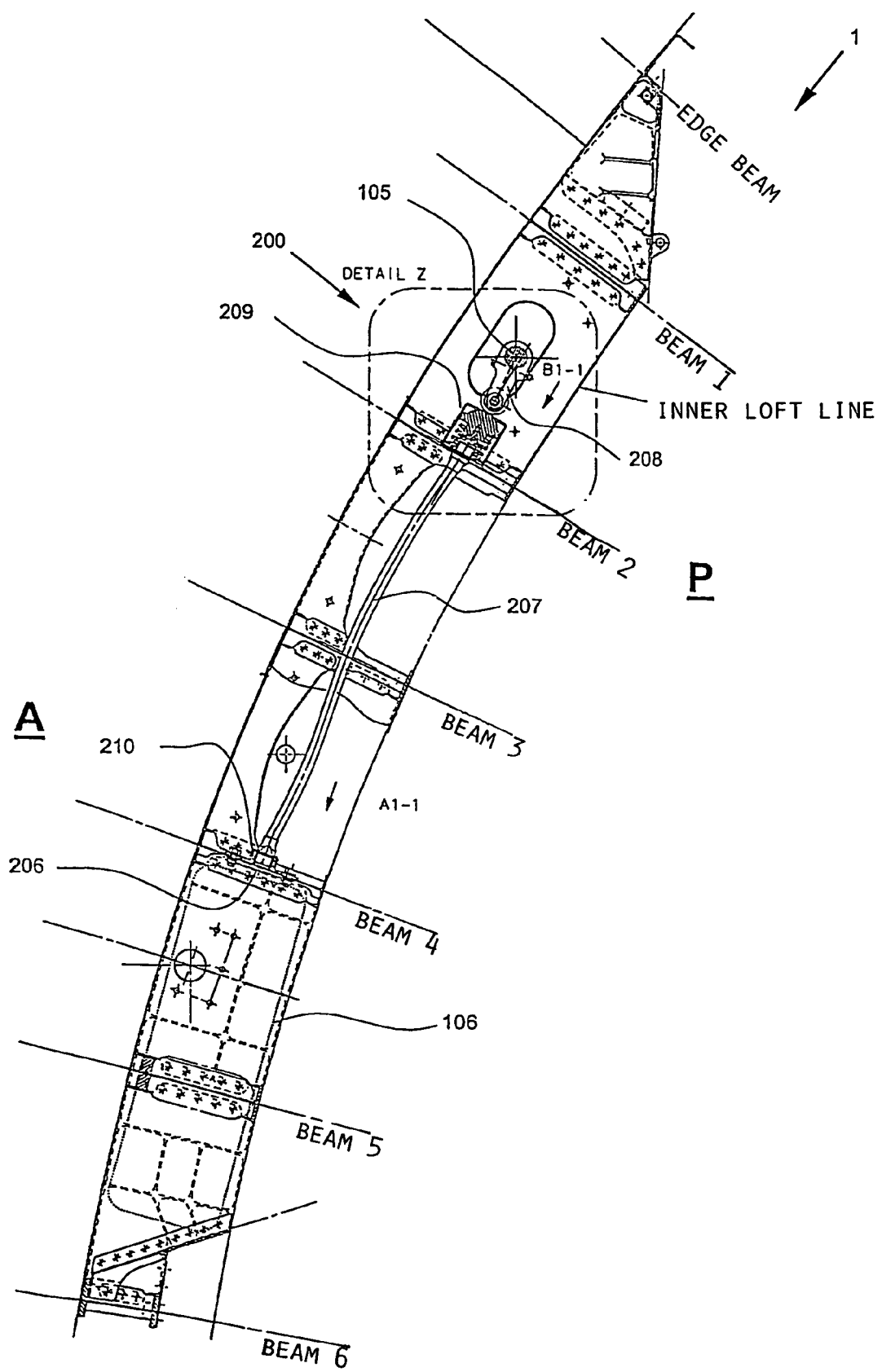
FIG. 3 the entire mechanism of the pneumatic remaining pressure indicator at the installation location in a sectional view that is referenced with the section A1—A1 in FIG. 2.

FIG. 3 shows the complete mechanism of the warning apparatus 200 in the section A1—A1. It consists of a flange 210 and particularly a lower flange 210 that is secured on the outside hand lever box 106 and that has a through-flow opening 206 in the lever box 106. From the flange 210, a pipe 207 leads to a valve 209, which is regulated by a control lever 208, which is driven by the rotation of the locking shaft 105. The pipe 207 can also be embodied in a flexible embodiment as an air guide hose/channel. If the locking shaft 105 of the door opening mechanism 100 turns in the clockwise direction in the course of the door opening process, then the control lever 208 opens the valve 209. The air then flows out of the passenger cabin P through the valve 209, the connected pipe 207, the through-flow opening 206 and the lower flange 210 into the hand lever box 106, and from there into the outside environment A. Thereby, an acoustic warning signal, preferably a hissing/rushing warning noise, is produced at the valve 209. With such a connection of the warning apparatus 200 on the outside hand lever box. 106, a hole in the outside skin of the aircraft door 1 is advantageously avoided. Similarly of advantage is the arising noise level in the production of the hissing/rushing behind a door interior covering or paneling (not shown), because thereby a passage for the further conveyance of the noise can be omitted. The noise insulation of the door is thus not impaired. Moreover, the noise is also audible outside of the cabin.

Figure 4:
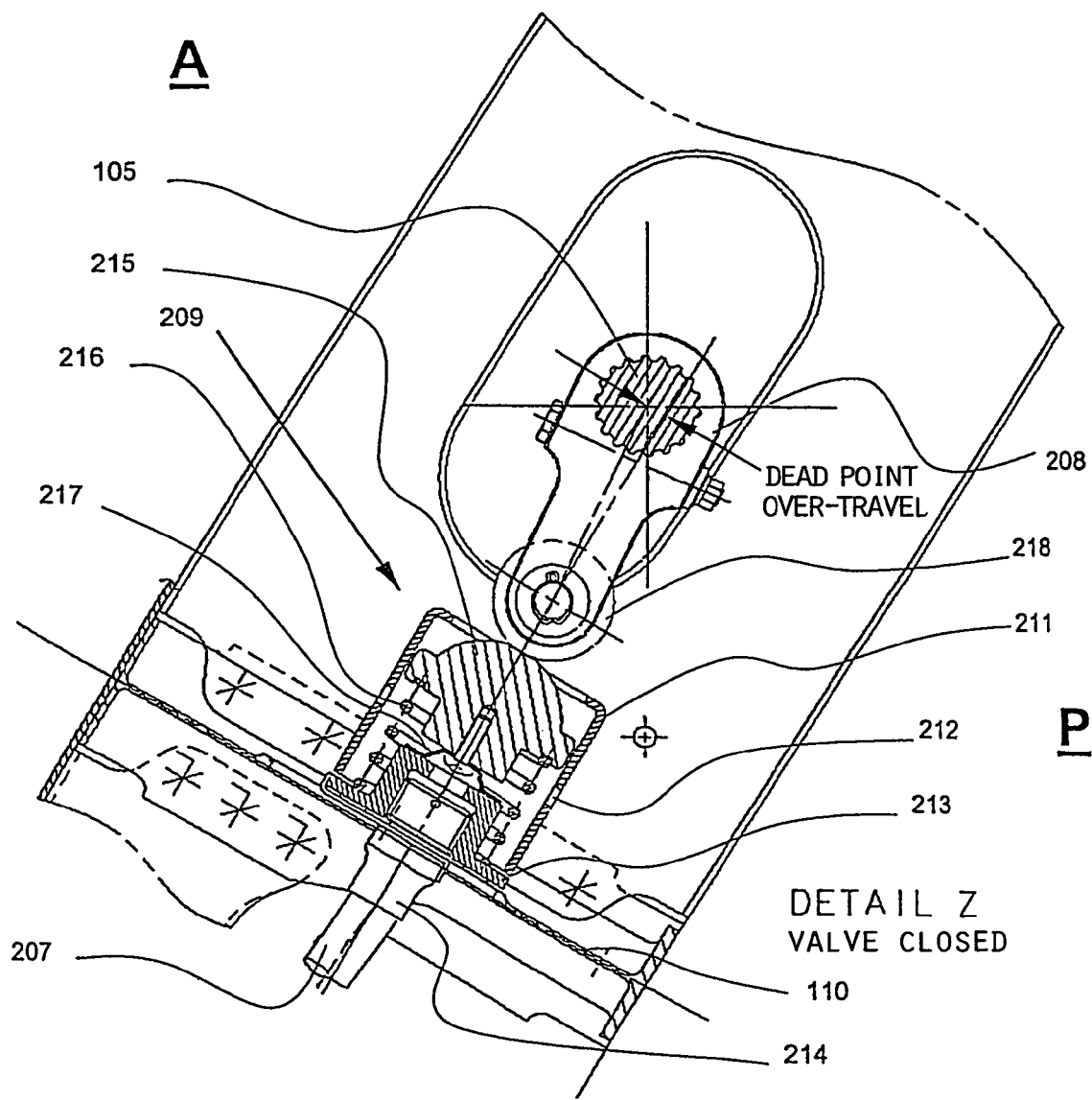
FIG. 4 the detail Z according to FIG. 3 with the illustration of a valve for the control of an acoustic warning signal in closed position as well as the lever necessary for the control on the locking shaft.

In FIG. 4, the exact manner of operation of the warning apparatus 200 is recognizable in connection with the enlarged illustration of the detail Z according to FIG. 3. The valve 209 is arranged on the aircraft door structure, a carrier or support 110, and is opened or closed by the control lever 208. The motion of the control lever 208 is directly coupled to the rotation of the locking shaft 105. The FIG. 4 shows the closed position of the valve 209, in which the further travel of the control lever 208 past the dead center point provides that the locking shaft 105 can under no circumstances be loaded with a moment by the warning apparatus 200, which moment tries to unlock the locking elements of the door opening mechanism 100. With the illustrated arrangement, it is ensured that the locking of the door is not impaired by the warning apparatus 200, but rather actually supports or assists it in addition to the already existing elements. The valve 209 consists of the valve flange 213 into which the connection stub 214 to the pipe 207 can be directly screwed-in, a helical spiral compression spring 216, a slide bolt 215 with connected seal rubber 217, and a valve housing 211.

The arrangement of the mentioned components is carried out so that the helical spiral compression spring 216 is centered on the valve flange 213 and tries to upwardly press the slide bolt 215, which on its part is centered in the valve housing 211, in order to thereby lift the seal rubber 217 away from the valve flange 213 and thereby to open the valve 209. This is prevented by the control lever 208, on the free end of which a roller 218 is located, and which presses against the slide bolt 215 in the closed position of the valve 209. Instead of the helical spiral compression spring 215, a spring-loading through other types of springs is also possible, whereby the slide bolt can then be omitted or replaced by a different mechanical element (for example a flap) for the closing of the out-flow opening.

The valve housing 211 has four in-flow openings 212, which are distributed in the circumferential direction and which produce the hissing/rushing as an acoustic warning after the opening of the valve 209.

In the closed position of the valve 209, the seal rubber 217 is loaded by the pressure difference between passenger cabin P and outside environment A. Thereby the seal security is further increased, because the flexible seal rubber 217 is loaded in addition to the pressure, which is exerted by the control lever 208 onto the slide bolt 215.

Figure 5:
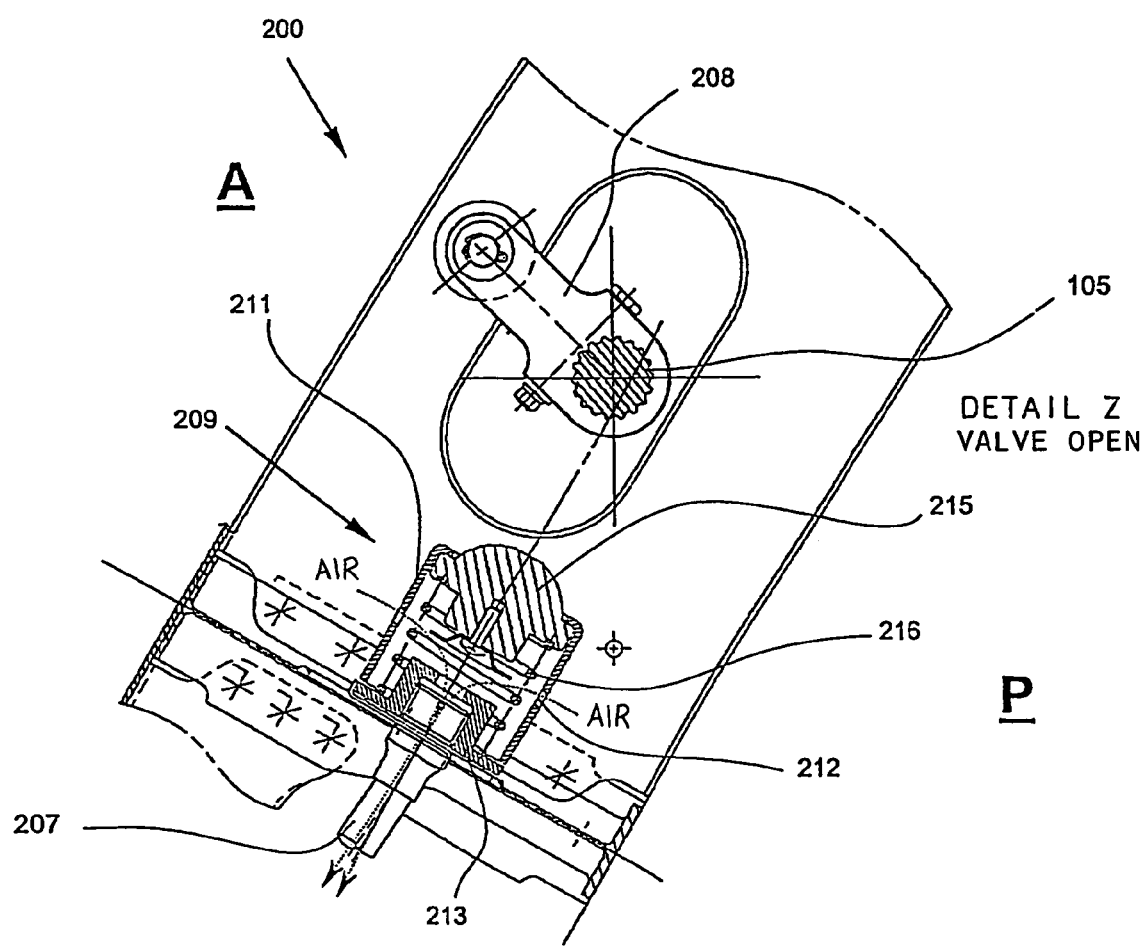
FIG. 5 the detail Z according to FIG. 3 with the illustration of the valve for the control of the warning signal in open position.

In FIG. 5, the valve 209 is shown in open position. Through turning or rotation of the locking shaft 105 during the door opening process, the control lever 208 is brought into this unlocked position upon reaching the end position of the inside hand lever 102. This motion occurs exactly in the same manner upon operation of the outside hand lever, because the inside hand lever rotates synchronously along with the operation of the outside hand lever.

In this position, the door 1 is completely unlocked by the elements of the door opening mechanism 100, lifted and can be opened. Because this position is not suitable for still providing a warning to the operator by means of the warning apparatus 200, if a pressure difference exists between the passenger cabin and the outside environment, the warning becomes active at a very much earlier lever position, so that enough time remains for the operator to interrupt or abort his door opening action in good time.

As can be seen from the FIGS. 4 and 5, the control lever 208 begins to open the valve 209 already at the moment in which it has rotated out of the dead center point position and runs along the round flank of the slide bolt 215. In parallel to this, the slide bolt 215 moves upwardly, driven by the helical spiral compression spring 216, and thus opens the through-flow in the valve flange 213. Thus, the control lever 208 already completely clears, frees or opens the valve 209 (=>warning noise) when the door 1 is not yet lifted and not yet completely unlocked. Thereby there arises a handling free play for the operator of the door, in which he can decide to abort the door opening process due to the existing differential pressure.

Figure 6:
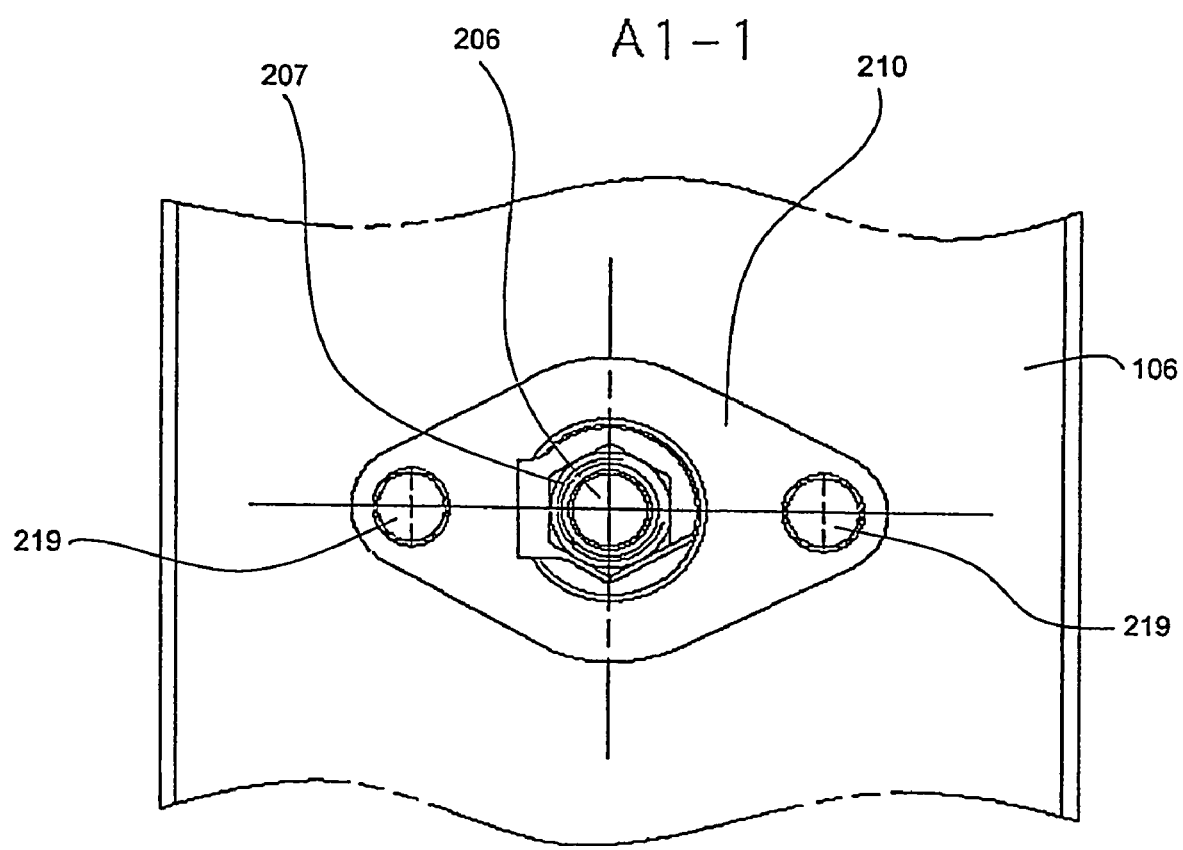
FIG. 6 the top plan view onto a bottom flange with a through-flow opening in the outside hand lever box.

For the further explanatory illustration of the inventive warning apparatus 200, the lower or bottom flange 210 is shown in a top plan view in FIG. 6. With the flange 210, the pipe 207 with a through-flow opening 206 to the outside hand lever box 106 is positioned on the door structure of the passenger door 1, and preferably screw-mounted by means of securing means 219.

However, further positions on the door structure are also conceivable, for example laterally next to or below the outside hand lever box.

Figure 7:
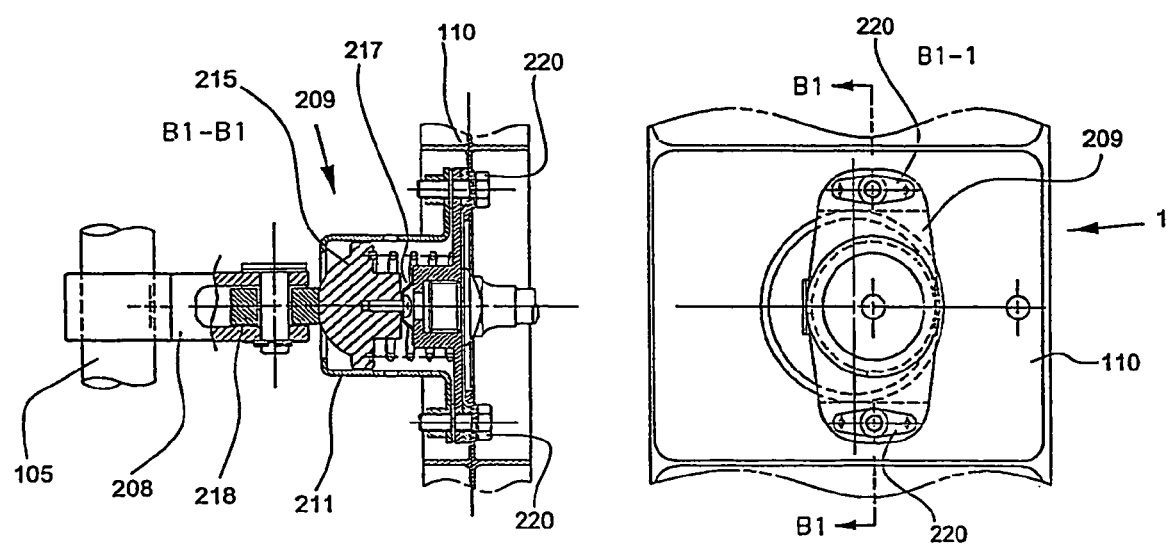
FIG. 7 the top plan view and a further sectional view of the closed valve and the control lever.

In FIG. 7, the manner of securing the valve 209 on the carrier or support 110 of the door structure is shown in supplemental views. In the sectional view B1—B1, the closed valve 209 is illustrated, whereby the closing is achieved by pressing of the slide bolt 215 by means of the roller 218 of the control lever 208. In the top plan view as well as in the side view, it is shown that screw connections find application as securing means 220 in the illustrated embodiment.

The invention claimed is:

1. Apparatus for warning of differential pressure during opening of a pressure-loaded closure device (1) of an opening in an aircraft fuselage by an opening mechanism (4; 100, 105) including a control lever (4; 208) and a flap (4A) that covers the control lever, characterized in that an air guide passage (6; 206, 207) is provided from a first side with higher pressure (P) to a second side with lower pressure (A), wherein the air guide passage is closeable by a valve (5; 209), and the valve (5; 209) is operatively connected with and controlled by the flap so that the valve is opened upon operation of the flap, and the apparatus produces an acoustic signal upon opening of the valve (5; 209) when a differential pressure exists between the first and second sides.

2. Apparatus according to claim 1, characterized in that the apparatus further includes a signal producing device that produces the acoustic signal, and the valve (5) is connected with the signal producing device (8).

3. Apparatus according to claim 2, characterized in that at least one of the air guide passage (6) or the signal producing device (8), in connection with existence of the differential pressure, guides an airflow in a targeted manner in a direction toward a hand of a person operating the control lever or the flap.

4. Apparatus according to claim 1, characterized in that the valve (5) itself comprises means for producing the acoustic signal.

5. Apparatus according to claim 1, characterized in that the control lever (4) is embodied as a door operating lever, and the door operating lever or the flap is operatively connected with the valve (5) via a mechanical connection (9) comprising a Bowden cable arrangement or a tension cable arrangement or a lever/rod mechanism or a transmission.

6. Apparatus according to claim 1, characterized in that, in the operation of the flag (4A) a first condition is reached, in which the valve (5) opens and, when the differential pressure exists, the acoustic signal is produced.

7. Apparatus according to claim 6, characterized in that the operation of the flap (4A) further results in a second condition, if the differential pressure does not exist and thus the opening process is able to further proceed.

8. Apparatus according to claim 1, characterized in that the closure device comprises a door, and the air guide passage (6) is provided in the door (1).

9. Apparatus according to claim 1, characterized in that the closure device comprises a door, and the air guide passage (6) is provided in a door frame (2) surrounding the door (1).

10. Apparatus according to claim 1, characterized in that the air guide passage is embodied as a connection pipe (6) or as a different type of air channel.

11. Apparatus according to claim 1, characterized in that the control lever (208) is provided on a free end thereof with a roller (218), which, for closing the valve (209), presses a spring-loaded slide bolt (215) with a connected seal (217) onto a valve flange (213), and for opening the valve (209) the spring-loaded slide bolt (215) is released through rotation of the control lever (208) and thus clears an out-flow opening in the valve flange (213).

12. Apparatus according to claim 11, characterized in that the out-flow opening in the valve flange (213), an inflow opening (212) on a valve housing (211) as well as the seal (217) are embodied for producing the acoustic signal as a hissing/rushing acoustic signal.

13. Apparatus according to claim 11, characterized in that the seal (217) is loaded in a direction of the outflow opening with an existing pressure difference between the first and second sides, and thereby closes the outflow opening additionally to a pressure of the spring-loaded slide bolt (215).

14. Apparatus according to claim 1, characterized in that the pressure-loaded closure device comprises an aircraft door, the control lever (208) is arranged on a locking shaft (105) of the opening mechanism (100), and through rotation of the locking shaft (105), a free end of the control lever (208) is moved in a circular arc path, whereby the valve (209) is opened before the opening mechanism (100) completely releases the aircraft door.

15. Apparatus according to claim 1, characterized in that, for a closed condition of the valve (209), an over-travel of the control lever (208) past a dead center point thereof is provided on a motion path of a free end of the control lever (208).

16. Apparatus for warning of differential pressure during opening of a pressure-loaded aircraft door (1), which closes an opening in an aircraft fuselage, by an opening mechanism (4; 100, 105), characterized in that an air guide passage (6; 206, 207) is provided from a first side in a passenger cabin inside the aircraft fuselage, via a through-flow opening in the aircraft door, to a second side exposed to an outside environment outside of the aircraft fuselage, wherein the through-flow opening (206) is arranged in an outside hand lever box (106) that is provided in the aircraft door, and wherein the air guide passage is closeable by a valve (5; 209) that is controllable with a control lever (4; 208) of the opening mechanism (4; 100, 105) that is operatively connected with the valve so that the apparatus produces an acoustic signal upon opening of the valve (5; 209) when a differential pressure exists between the first and second sides.

17. Apparatus according to claim 16, characterized in that the air guide passage proceeds via the valve (209) and a connected air guide device (207) to the through-flow opening (206).

18. Apparatus according to claim 17, characterized in that the air guide device (207) is positioned by a flange (210) on a door structure (110) of the aircraft door in the hand lever box (106).

* * * * *

UNITED STATES PATENT AND TRADEMARK OFFICE
CERTIFICATE OF CORRECTION

PATENT NO. : 7,207,524 B2  Page 1 of 1
APPLICATION NO. : 10/526424
DATED : April 24, 2007
INVENTOR(S) : Puschmann et al.

It is certified that error appears in the above-identified patent and that said Letters Patent is hereby corrected as shown below:

Title page,
Item [56], Other Publications,
Line 3, replace "zreferplus." by --xreferplus.--;

Column 2,
Line 49, after "area", delete --,--;

Column 7,
Line 54, after "of the", replace "flag" by --flap--;

Column 8,
Line 15, after "an", replace "inflow" by --in-flow--;
Line 20, after "of the", replace "outflow" by --out-flow--;
Line 22, after "the", replace "outflow" by --out-flow--.

Signed and Sealed this

Eighteenth Day of March, 2008

JON W. DUDAS
*Director of the United States Patent and Trademark Office*